3,488,197
PROCESS FOR PREPARING A FLAVORED FIBROUS PROTEIN PRODUCT CONTAINING A HIGH FAT CONTENT

John A. Page, Minneapolis, and Walter G. Bauer, Hopkins, Minn., assignors to General Mills, Inc., a corporation of Delaware
No Drawing. Filed May 28, 1965, Ser. No. 459,895
Int. Cl. A23j 1/14
U.S. Cl. 99—17                         7 Claims

ABSTRACT OF THE DISCLOSURE

A fibrous food product is processed by drying the material to a predetermined moisture level and then toasting the dried product prior to enrobing the toasted product in a fat such as vegetable oil to yield a flavorful product of relatively high fat content.

---

This invention relates to a process for preparing a new and useful food product and more particularly to a process for preparing a smoke flavored protein product.

Various fibrous protein products which simulate the general characteristics of various meat products have recently been prepared from edible proteins. Fibrous products have been prepared from vegetable proteins such as soybean, corn, and peanut as well as animal protein, such as casein and keratin. These proteins can be processed to form simulated meat products as illustrated, for example, by the techniques set forth in the U.S. Patent 2,682,466. Fibrous protein products have been prepared from such proteins as soy protein by forming a spinning dope from the protein and extruding the dope through a perforated die or membrane into an aqueous precipitating bath containing an acid and a salt. Filaments or fibers are formed in the bath and may be stretched to orient the molecular structure of the fibers. Thereafter, the fibers are neutralized to a pH of about 4.0 to about 7.0 by a neutralizing solution or by simply water washing the filaments.

Normally, the bundle of fibers or tow is then subjected to further processing in order to produce a product which simulates not only the fibrous texture of meat products but also the flavor and color characteristics. Accordingly, binders such as egg albumen, starch, gum, cereals, dextrines, proteins, alginates, carboxymethyl cellulose or the like are used at least partially to agglutinate the fibers to simulate the connective tissues of various meat products.

Vegetable and animal fats or combination of such fats are normally added to the fibers to raise the fat content of the protein fiber. The fat content is frequently adjusted to simulate a preselected meat product. The type of fat is often selected for reasons of market objectives and the like. For instance, a vegetable fat such as cottonseed oil has been used where an unsaturated fat is desired for a simulated meat containing no animal products. Where there is no objection to the use of an animal fat, such fats may be incorporated in the fiber to achieve the desired fat level. Other ingredients such as flavoring agents, coloring, seasoning and the like have been added to further simulate a particular meat product. For instance, many prepared meats such as ham have flavors which are produced by the use of sugar, smoke flavorings and similar flavorings.

The binder, fat, and other ingredients are frequently added to the fibrous protein by immersing the tow in a bath containing an aqueous solution of the various ingredients. The tow may be agitated by one or more methods to force the binder, fat and other ingredients into the tow thus simulating the general characteristics of a meat product.

Various smoke flavored products such as ham and bacon have been made according to the above-described techniques. Some of the smoke flavored products have been characterized as products which have a relatively high moisture content and therefore have limited commercial application for combination with other products. Often a smoke flavored product is desired which has the crisp, fried texture and other characteristics of a smoke flavored, fried bacon-type product. Economical simulation of such a product is rather difficult to achieve. The simulation of desired bacon crispness together with control and development of acceptable flavor characteristics has not been achieved with satisfaction by the prior art.

Therefore, it is an object of the present invention to provide a new and improved process for producing a flavored fibrous protein product.

It is another object of the present invention to provide a new and improved process for producing a smoke flavored fibrous protein product which simulates the general characteristics of meat.

It is a further object of the present invention to provide a new and improved process for producing smoke flavored simulated meat products having a crisp texture and a relatively low moisture content.

It is a further object of the present invention to provide a process for producing a smoke flavored simulated meat product having a crisp texture and relatively low moisture content by drying the product and then toasting the product to produce the crisp characteristics of fried bacon.

It is yet another object of the present invention to provide a new and improved process for producing a smoke flavored simulated meat product having a crisp texture and other general characteristics of a fried bacon-like product by toasting the product and enrobing the product with a fat.

The practice of the process according to the invention generally involves the treatment of an impregnated fibrous tow by drying the impregnated material after it has been impregnated with suitable binders, fats, flavoring agents, seasonings, coloring agents and the like which duplicate the particular meat to be simulated. After the product is dried to a predetermined moisture level, the dried product is then toasted by subjecting the product to relatively high temperatures. The high temperatures toast the product and incidentally remove additional moisture from the product. This toasted product is then enrobed by subjecting the dried product to additional quantities of fat to increase the fat content of the product. The fat chosen for this enrobing may be identical to the fat used to impregnate the product or it may be a different fat depending upon the finished characteristics desired for the product.

A fibrous protein product is impregnated with a binder, fat, coloring agent, flavoring agents and the like according to the above described procedures. Preferably, the protein product is produced from a soybean protein and egg albumen is utilized as the binder. The fat utilized is a matter of choice, however, a vegetable fat such as coconut oil, cottonseed oil or the like is preferably utilized for producing a simulated meat product. Since the process will be described with respect to production of a smoke flavored crisp bacon-like product, the coloring agents and flavoring agents are selected accordingly. In this case, the coloring agent is selected to give the finished product a bacon-like appearance. The flavoring agent is an artificial liquid smoke commonly available on the market.

The smoke flavored impregnated fibrous protein generally contains about 45 to about 60% moisture after it has been impregnated with the various ingredients. While this product with this high moisture content is a usable product, the high moisture content of the product presents a number of problems if the product is to be merchandised through retail stores and the like. Shipping costs are increased by the high moisture content, preservation problems become more troublesome, and sanitation problems arise due to contamination of the product by bacteria and similar organisms. Further, the fibrous protein product with the various flavorings and additives often does not have the desired flavor characteristics. Therefore, this high moisture product is first dried. The smoke flavored impregnated fibrous protein product is first dried in a suitable dryer to a moisture range of about 5% to about 25% moisture based on the weight of the product. The drying can be carried out by a number of machines or ovens designed for this purpose, however, it has been found that a hot air dryer which circulates heated air in the range of about 100° F. to about 175° F. will reduce the moisture content of the moist impregnated fiber from the 55% level to the range of about 5% to about 25% in an effective and efficient manner.

The drying step can be controlled so that the product is dried to a moisture content which is somewhat compatible with the end use for the product and to prepare the product for further processing. For instance, where the smoked fibrous protein product is to be utilized in connection with other dehydrated products, the moisture content of the fibrous protein product may more desirably be in the lower portion of the noted range. Generally, it has been found that the product dried to a moisture range based on the weight of the product of about 8 to about 12% moisture in a heating system utilizing hot air temperatures in the range of about 130° F. to about 160° F. produces a dried product which can be effectively toasted, enrobed and utilized with a broad range of complementary food products.

After the impregnated protein product has been dried to the desired moisture range, the dried product is next toasted. This toasting is desirable in order to develop over-all flavor of the dried product. It is also believed that the toasting contributes to development of crispness of the product. The toasting is accomplished by subjecting the dried impregnated protein product to temperatures in the range of about 200° F. to about 600° F. for a sufficient period of time to toast the product. Toasting is accomplished either by subjecting the product to a gas heated to high temperatures or by exposing the product to a heat source such as a gas flame or an electric heating coil. As the product is toasted, the high temperatures reduce the moisture content of the product to below 5% based on the weight of the product. The toasting step not only tends to develop flavor in the smoked flavored product but it also enhances the storage capabilities of the product by further reducing the moisture content of the product. The moist product which contains about 55% moisture for example tends to be tough and somewhat unpalatable. The dried product also tends to have a marked toughness and does not have the flavor development achieved in the toasted product. The toasting is believed to caramelize some of the sugar in the product and also alter the flavoring agents to produce a desired flavored product.

The toasting of the dried protein product can be carried out on a belt type, hot air system wherein air heated to suitable temperatures is circulated about the fibrous product to toast the product. A more suitable apparatus is a fluid bed type of dryer. In this apparatus, the dried product, or the product before it is dried, is severed into small chunks of material. These small chunks or pieces are then introduced into a fluid bed where they are tumbled by the force of air flowing through the bed of material. This tumbling action produced in the fluid bed heater results in uniform contact on all sides of each chunk by the heated air. This produces a uniformly toasted and generally high quality product and is the preferred method of toasting the product. Other toasting methods might be utilized depending upon the nature of the product which is desired. For instance, if the product desired is one wherein a variation in the toasting is desired, then a less efficient type toaster might be utilized so that a portion of the particles are heated to much greater temperatures and other portions of the product are toasted to a lesser degree. While this type of product normally would be considered an inferior type product, there may be applications where such a non-uniform product are desired and such applications are within the contemplation of the process described herein.

Preferably, the product is toasted to a moisture content of below 2% by weight and this can be effectively achieved by subjecting the dried product to temperatures of about 250° F. to about 400° F. for a sufficient period of time to reduce the moisture content of the dried product to below 2%. As previously noted, this lower moisture content will further enhance storage characteristics of the product and produce a generally more acceptable dehydrated type product. The toasted fibrous protein product has a crisp texture but has a rather dry appearance after it has been subjected to the toasting step. Normally, bacon which has been fried has a quantity of fat clinging to the surface of the bacon pieces. For many applications wherein the product is to be utilized in connection with other foods, this additional fat clinging to the outer surface of the product is desirable. Accordingly, the next step concerns enrobing the toasted product with a fat. This fat may be either a vegetable or an animal fat such as lard or beef tallow. Preferably, however, the fat is a vegtable fat such as coconut oil, cottonseed oil, corn oil, peanut oil or the like. Enrobing is herein defined to mean coating a product with fat at ambient or elevated temperatures. The fat is applied to the toasted product by applying the fat to the surface of the product, for example by spraying, as it is tumbled or agitated in a suitable tumbling apparatus. The tumbling is carried out in order to insure a complete coating of fat is applied to the product and in order to insure a uniform application of the fat to the product. The fat is applied so that a quantity of the applied fat as absorbed by the toasted product.

If the fat utilized to enrobe the product is a fat such as coconut oil, then the fat may need to be heated slightly above room temperatures in order to accomplish the application of the fat to the product. Sufficient fat is applied to the toasted product in order to raise the total fat content of the product to about 10% to about 45% of the product by weight. It will be observed that close control of the amount of fat desired in the finished product may be achieved since the requirements in the finished product can be calculated. A portion of the fat may be added during the impregnation of the protein fibers and the remainder of the fat may be added during this enrobing step. With such a division in the points at which fat is added to the product, the fats may be selected for particular handling characteristics at the different points in the process. For instance, a fat which readily impregnates a fibrous product can be utilized during the impregnation of the fibrous product. This impregnating fat contributes to the texture and flavor of the finished product. A different type of fat may be desired for storage, temperature characteristics, flavor characteristics or similar reasons during the enrobing step. Accordingly, the enrobing step lends flexibility to application of the fat to a product to bring the product to the proper fat level.

Preferably, sufficient vegetable fat such as coconut oil is added to the toasted product in order to bring the total fat content of the product to about 20 to about 40% by weight. This produces a balanced product containing the desired amount of fat for a smoke flavor crisp bacon like product. Further, this level of fat permits sufficient fat to be added to the product during the enrobing step to give the product a palatable and acceptable characteristic without destroying the crispness of the product.

The invention will now be more fully understood by reference to the following examples of processing conditions for preparing a product according to the present invention.

EXAMPLE I

A batch of fibrous soy protein was prepared using known techniques of preparing such fibers. The fibrous protein was then impregnated by immersing the fibrous protein in an aqueous solution containing ingredients selected for the purpose of simulating a smoke flavored bacon like meat product. The impregnated product containing about 55% moisture by weight was then removed from the solution. The impregnated product contained the following percent of ingredients and soy protein calculated on a moisture free basis (MFB).

| Ingredient: | Percent MFB |
|---|---|
| Egg albumin | 3.46 |
| Salt | 11.59 |
| Sugar | 3.46 |
| Coconut oil | 19.97 |
| Liquid smoke | 0.46 |
| Flavoring | 27.77 |
| Dye solids FD & C Red #2 | .07 |
| Soy protein solids | 33.22 |
|  | 100.00 |

The impregnated product containing the listed ingredients and about 55% moisture was then dried by subjecting the product to air heated to about 125 to about 140° F. The drying reduced the moisture content about 10% by weight of the product. The dried product was then passed through a fluid bed type oven where the product was subjected to temperatures of from 300° to 350° F. to toast the product. This toasting step also further reduced the moisture content of the product to less than 5%. Finally, liquid coconut oil was used to enrobe the product by applying a coating of the oil to the outside surface of the toasted product. Sufficient oil was applied to raise the total fat content of the enrobed product to a level of about 25 to 35% by weight of the enrobed product. The finished product had a smoke flavor with the crisp texture and general appearance of fried bacon.

EXAMPLE II

Example I was repeated with a change in the ingredients making up the impregnated product in accordance with the following listing. The ingredients are a percentage of the weight of the impregnated product, calculated on a moisture free basis.

| Ingredients: | Percent MFB |
|---|---|
| Egg albumen | 3.55 |
| Salt | 13.09 |
| Sugar | 3.91 |
| Coconut oil | 19.51 |
| Liquid smoke (Firmenich 51.676K) | 0.48 |
| Flavoring (Stange 5075) | 28.54 |
| Dye Solids FD&C Red #2 | .07 |
| Soy protein solids | 30.85 |
|  | 100.00 |

The product had substantially the same texture and general appearance of the product of Example I.

It is to be understood that the invention is not to be limited to the exact details of operation or the compositions shown and described as examples. Obvious modifications will be apparent to those skilled in the art. For instance, a wide variety of compositions may be used, some of which contain mixtures of fats, both vegetable and animal. Various meats may be simulated by changing the flavoring agents and coloring agents. Toasting can be carried out in a variety of ovens which are capable of subjecting the product to toasting temperatures. Likewise a wide variety of devices may be used for drying and enrobing the product.

Now therefore we claim:

1. A process for treating a smoke flavored, impregnated and at least partially agglutinated spun soy protein fiber which comprises drying the fibers to a moisture content of about 8% to about 12% by weight, toasting the dried fibers by subjecting the fibers to temperatures of about 200° F. to about 600° F. wherein the moisture content of said fibers is reduced to less than about 5% by weight, and then enrobing the toasted fibers with a vegetable fat to yield a product having a total fat content of about 20% to about 40% by weight.

2. A process in accordance with claim 1 in which said vegetable fat is coconut oil.

3. A process in accordance with claim 1 in which the dried fibers are toasted for a sufficient period of time to reduce the moisture content to less than about 4% by weight.

4. A process for treating a smoke flavored, impregnated and at least partially agglutinated spun protein fiber which comprises drying the fibers to a moisture content of about 5% to about 25% by weight, toasting the dried fibers by subjecting the dried fibers to air heated to temperatures of about 250° F. to about 400° F. wherein the moisture content of said fibers is reduced to less than about 5% by weight, and then enrobing the toasted fibers with a fat to yield a product having a final fat content of about 25 to about 35% by weight.

5. A process in accordance with claim 4 in which the dried fibers are toasted for a sufficient period of time to reduce the moisture content to less than about ½ to about 4% by weight and in which the protein is a soy protein and the fat is a vegetable fat.

6. A process for treating a smoke flavored, impregnated and at least partially agglutinated spun soy protein fiber which comprises drying the fibers to a moisture content of about 8 to about 12% by weight, toasting the dried fibers by subjecting the dried fibers to air heated to temperatures of about 300° F. to about 350° F. for a sufficient period of time to reduce the moisture content of the fibers to less than 2% by weight, and then enrobing the toasted fibers with a vegetable fat to yield a product having a final fat content of about 25 to about 35% by weight.

7. A process in accordance with claim 6 in which the fiber is cut into pieces of substantially uniform size prior to drying.

References Cited

UNITED STATES PATENTS

| 2,705,679 | 4/1955 | Griffiths et al. | 99—207 |
| 2,730,447 | 1/1956 | Boyer | 99—14 |
| 2,802,737 | 8/1957 | Anson et al. | 99—14 |
| 2,879,163 | 3/1959 | Anson et al. | 99—14 |
| 2,952,543 | 9/1960 | Szczesniak et al. | 99—14 |
| 3,093,483 | 6/1963 | Ishler et al. | 99—14 X |
| 3,157,516 | 11/1964 | Huber et al. | 99—14 X |
| 3,320,070 | 5/1967 | Hartman | 99—14 X |

MAURICE W. GREENSTEIN, Primary Examiner

H. H. KLARE III, Assistant Examiner

U.S. Cl. X.R.

99—14